United States Patent [19]  [11] 4,363,655
Iizuka et al.  [45] Dec. 14, 1982

[54] METHOD FOR OPERATING BLAST FURNACE

[75] Inventors: Motohiko Iizuka; Genji Nakatani, both of Fukuyama; Sumiyuki Kishimoto, Hiroshima, all of Japan

[73] Assignee: Nippon Kokan Kabushiki Kaisha, Tokyo, Japan

[21] Appl. No.: 186,406

[22] Filed: Sep. 11, 1980

[30] Foreign Application Priority Data

Oct. 8, 1979 [JP] Japan ................... 54/129619

[51] Int. Cl.³ ............................................. C21B 5/06
[52] U.S. Cl. ....................................... 75/41; 266/140; 266/156
[58] Field of Search ............... 75/41, 42; 266/156, 266/140

[56] References Cited

U.S. PATENT DOCUMENTS

| 1,742,750 | 1/1930 | Bradley | 75/41 |
| 3,298,824 | 1/1967 | Grace et al. | 75/41 |
| 3,951,644 | 4/1976 | Block et al. | 75/42 |

FOREIGN PATENT DOCUMENTS

| 2546502 | 4/1977 | Fed. Rep. of Germany | 75/41 |
| 1319464 | 1/1963 | France | 75/41 |
| 47-1948178 | 6/1972 | Japan | 75/41 |
| 53-7610478 | 7/1978 | Japan | 75/41 |

Primary Examiner—M. J. Andrews

[57] ABSTRACT

A method for operating a blast furnace, characterized by: adding a prescribed volume of blast furnace gas to an air for blast fed to a hot stove; oxidizing, in the hot stove, CO contained in the blast furnace gas into $CO_2$ and $H_2$ contained therein into $H_2O$ to prepare a blast containing $CO_2$ and $H_2O$ and additionally heated by the above-mentioned oxidation; blowing the resultant blast containing $CO_2$ and $H_2O$ into a blast furnace through tuyeres thereof; thereby controlling the calorific value at the portions around the tuyere exits as a result of the endothermic effect produced by the reactions at the portions around the tuyere exits of the $CO_2$ and $H_2O$ contained in the blast with red-hot coke in the blast furnace wherein the amount of the blast is substantially equal to that of a blast without addition of a blast furnace gas.

2 Claims, No Drawings

METHOD FOR OPERATING BLAST FURNACE

FIELD OF THE INVENTION

The present invention relates to a method for operating a blast furnace, which permits maintenance of stable furnace conditions, prevention of production costs of pig iron from increasing, and efficient operation of the blast furnace.

BACKGROUND OF THE INVENTION

In operating a blast furnace, a lower-rate operation may sometimes be carried out which comprises decreasing the production from that in the usual operation. Such a lower-rate operation can be conducted by decreasing the volume of blast blown as a reducing gas into the blast furnace through the tuyeres thereof. In other words, a decreased volume of air blast fed to the blast furnace leads to a decelerated reduction reactions of iron ore, thus resulting in a decreased production of pig iron.

However, when the volume of reducing gas flowing through the blast furnace decreases to below a certain limit through the above-mentioned decrease in the volume of blast, the flow of the blast in the blast furnace becomes non-uniform in the cross-sectional direction of the furnace. More particularly, the distribution of burden raw materials such as iron ore and coke charged into the blast furnace is not uniform, but there are portions rich and poor in voids between pieces of burden raw materials. Therefore, when the volume of blast flowing in the blast furnace decreases to below a certain limit, the blast passes through only the portions rich in voids between pieces of burden raw materials, and not through the portions poor in voids between pieces of burden raw materials. As a result, the reduction reactions of iron ore in the blast furnace cannot proceed uniformly, resulting in the furnace conditions becoming unstable and production of deposits onto the furnace wall. Such deposits onto the furnace wall, if produced, causes partial stagnation of the burden descent through the blast furnace in the form of the phenomenon known as hanging, which in turn causes slips in which broken hanging results in sudden descent of the burden. Consequently, the descending speed of burden through the blast furnace becomes non-uniform and the furnace conditions are extremely deteriorated.

A lower-rate operation of pig iron in a blast furnace is possible also by discontinuing blowing of the above-mentioned blast to be blown through the tuyeres into the blast furnace periodically for a prescribed period of time. However, when blowing of blast to be blown into the blast furnace is discontinued, the burden in the furnace is not heated during the blowoff. The interior of the blast furnace is therefore cooled, and this may result in the impossibility of discharging pig iron and slag from the blast furnace. Blowoff also causes unstable furnace conditions.

With a view to solving the above-mentioned problems, the following methods are known, which comprises, in a method for operating a blast furnace, adding to air for blast to be blown into the blast furnace nitrogen gas as the inert gas not contributing to the reduction of iron ore:

(1) a method for operating a blast furnace, disclosed in Japanese Patent Publication No. 19,481/72 filed June 3, 1972, which comprises:

to a blast to be blown into tuyeres of a blast furnace, adding nitrogen gas in an amount of up to 40 vol. % of said blast; and, (2) a method for blowing $N_2$ gas into a blast furnace, disclosed in Japanese Patent Provisional Publication No. 76,104/78 filed July 6, 1978, which comprises:

directing $N_2$ gas containing at least 3% $O_2$ discharged from an oxygen generating plant into a blast main connected to the inlet of a blower for a blast furnace, and blowing said $N_2$ gas into the blast furnace, together with a blast.

According to the above-mentioned methods (1) and (2), by blowing a blast enriched with nitrogen gas in a prescribed volume per unit period of time into the blast furnace through the tuyeres, the reduction reactions of iron ore are decelerated even the volume of blast blown into the blast furnace is the same as the volume of blast in an operation not applied with a lower-rate production. As a result, this method allows a decrease in pig iron production while preventing furnace conditions from becoming unstable.

The above-mentioned methods (1) and (2) are however disadvantages in that they invalve higher production costs of pig iron because of the high price of nitrogen gas to be added to the air for blast. These methods are also disadvantageous in that the increase in the nitrogen content in the blast largely reduces the calorific value of blast furnace gas recovered from the top thereof. Since the aforementioned blast furnace gas is utilized as a fuel for heating furnaces in an iron works, the decrease in the calorific value of blast furnace gas adversely affects the operation of the iron works as a whole.

It has been the usual practice, on the other hand, in the operation of a blast furnace, to inject an auxiliary fuel such as heavy oil as a fuel and a reducing agent, through the tuyeres, together with the blast, with a view to reducing the consumption of coke per ton of produced pig iron (the coke rate). Recently, however, petroleum oils such as heavy oil are in short supply and prices thereof are only increasing. It is therefore becoming more common not to inject such an auxiliary fuel as heavy oil as mentioned above as fuel and reducing agent in the operation of a blast furnace, but employ coke only.

In the conventional operation with injection of an auxiliary fuel such as heavy oil, the auxiliary fuel blown through the tuyeres is decomposed at the portion near the tuyere noses into such reducing gases as carbon monoxide and hydrogen which reduce iron ore. The decomposing reaction of the above-mentioned auxiliary fuel such as heavy oil at the portion near the tuyere exits, being an endothermic reaction, causes decrease in the temperature at the portion in the blast furnace near the tuyere exits. In the conventional blast furnace operation, therefore, the portion around the tuyere exits is kept at an appropriate temperature by the temperature decreasing effect of the above-mentioned endothermic reaction. However, in the operation based on coke only without employing an auxiliary fuel such as heavy oil as mentioned above as fuel and reducing agent, an endothermic reaction does not take place at the portion around the tuyeres as that caused by an auxiliary fuel such as heavy oil as mentioned above. The temperature of the portion around the tuyere exits therefore becomes excessively high, resulting in unstable furnace conditions. The furnace conditions becoming unstable under the effect of temperature rise at the portion around the tuyere exits are attributable to the fact that the ash in the coke burnt in the portion around the tuyere exits causes production of slag rich in silicon oxide ($SiO_2$) which floats up in a gaseous form and condenses at the bosh of the furnace, thus impairing gas permeability through the blast furnace.

Therefore, when carrying out the operation based on coke only without using an auxiliary fuel such as heavy oil, it is necessary to reduce the temperature of the portion around the tuyere exits in the blast furnace. For this purpose, the following methods have been applied to reduce the temperature of the portion around the tuyere exits:

(1) decreasing the temperature of the blast to be blown through the tuyeres into the blast furnace; and, (2) adding steam to the blast to be blown through the tuyeres into the blast furnace, thereby causing an endothermic reaction between steam and coke at the portion around the tuyere exits, and decreasing the temperature of the portion around the tuyere exits under the effect of this endothermic reaction.

In the above-mentioned methods, however, the calorific value for reducing iron ore in the blast furnace is decreased either by the reduction of the blast temperature or by the endothermic reaction caused by steam at the portion around the tuyere exits. It becomes therefore necessary to compensate the above-mentioned decrease in the calorific value by increasing the quantity of coke charged into the blast furnace. When carrying out the operation based on coke only without using an auxiliary fuel such as heavy oil, therefore, there would be such difficulties as a considerable increase in the coke consumption per ton of pig iron (coke rate) and the rise in production costs of pig iron.

Even when operation is conducted by injecting an auxiliary fuel such as heavy oil, an operation carried out with the quantity of injected auxiliary fuel decreased as compared with that in an ordinary operation involves the same problems as in the above-mentioned operation without using an auxiliary fuel.

For these reasons, there has been a keen demand for the development of a method for operating a blast furnace, which does not lead to deteriorated furnace conditions, permits prevention of the iron production costs from increasing, and does not cause decrease in the calorific value of blast furnace gas recovered from the furnace top, when conducting a lower-rate operation of pig iron, or an operation based on coke only without using an auxiliary fuel such as heavy oil as fuel and reducing agent, or an operation with a decreased quantity of such an auxiliary fuel as heavy oil. However, such a method for operating a blast furnace is not as yet proposed.

SUMMARY OF THE INVENTION

Another object of the present invention is to provide a method for operating a blast furnace, which, when conducting a lower-rate operation, prevents the iron production costs from increasing, and does not result in a decrease in the calorific value of blast furnace gas recovered from the furnace top.

An object of the present invention is to provide a method for lower-rate operation a blast furnace, which, when conducting an operation of a blast furnace based on coke only as fuel and reducing agent without using an auxiliary fuel such as heavy oil as fuel and reducing agent, does not lead to deteriorated furnace conditions.

Another object of the present invention is to provide a method for lower-rate operation of a blast furnace, which does not result in a decrease in the calorific value of blast furnace gas recovered from the furnace top.

In accordance with one of the features of the present invention, there is provided a method for operating a blast furnace, which comprises:

adding a prescribed volume of blast furnace gas to air for blast which is fed to a hot stove; and oxidizing, in said hot stove, CO contained in said blast furnace gas into $CO_2$ and $H_2$ contained therein, into $H_2O$ to prepare a blast containing $CO_2$ and $H_2O$; and then blowing said blast containing $CO_2$ and $H_2O$ and additionally heated by the above-mentioned oxidation into a blast furnace through the tuyeres thereof; and controlling the calorific value at the portion around the tuyere exits under the endothermic effect produced from the reaction at said portion around the tuyere exits of $CO_2$ and $H_2O$ contained in said blast with red-hot coke in the blast furnace.

DETAILED DESCRIPTION OF PREFERRED EMBODIMENTS

From the above-mentioned point of view, we carried out extensive studies to solve the aforementioned problems encountered when conducting a lower-rate operation, or an operation based on coke only without causing an auxiliary fuel such as heavy oil as fuel and reducing agent, or an operation with a consumption of said auxiliary fuel such as heavy oil decreased as compared with that in an ordinary operation. As a result, we have successfully developed a method for operating a blast furnace, which comprises:

adding a prescribed volume of blast furnace gas to an air for blast fed to a hot stove; and oxidizing, in said hot stove, CO contained in said blast furnace gas into $CO_2$ and $H_2$ contained therein, into $H_2O$ to prepare a blast containing $CO_2$ and $H_2O$; and then blowing said blast containing $CO_2$ and $H_2O$ and additionally heated by the above-mentioned oxidation into a blast furnace through the tuyeres thereof; and controlling the calorific value at the portion around the tuyere exits under the endothermic effect produced from the reaction at said portion around the tuyere exits of $CO_2$ and $H_2O$ contained in said blast with red-hot coke in the blast furnace.

Now, the method for operating a blast furnace of the present invention is described with reference to examples of the lower-rate operation.

When conducting a lower-rate operation by the method of the present invention, blast furnace gas recovered from the top of a blast furnace is added in a prescribed ratio to an air for blast before being fed into a hot stove to be heated therein. The air for blast thus containing blast furnace gas is fed into the hot stove to be heated therein. Table 1 covers an example of the chemical composition of blast furnace gas.

TABLE 1

| $N_2$ | CO | $CO_2$ | $H_2$ | $H_2O$ |
|---|---|---|---|---|
| 53.5 wt. % | 21.5 wt. % | 22.5 wt. % | 2.5 wt. % | 20 g/Nm³ |

By adding a blast furnace gas having the chemical composition mentioned above to air for blast prior to heating in a hot stove, the air for blast contains CO, $CO_2$ and $H_2$ in the composition thereof. This air for blast containing CO, $CO_2$ and $H_2$ is fed to the hot stove and heated to a prescribed temperature, CO and $H_2$ react with $O_2$ so that CO is oxidized into $CO_2$, and $H_2$, into $H_2O$. The air for blast is thus converted into a blast containing $CO_2$ and $H_2O$ and additionally heated by the above-mentioned oxidation. When the blast thus heated to a prescribed temperature in the hot stove and containing $CO_2$ and $H_2O$ is blown through the tuyeres into a blast furnace in a prescribed volume per unit time, the blast blown into the blast furnace reacts with red-hot coke in the blast furnace at the portion around the tuyere exits, so that $CO_2$ in the blast is converted into CO, and $H_2O$ in the blast, into $H_2$. These reactions cause an endothermic effect at the portion around the tuyere exits.

Table 2 shows changes in the chemical composition and in the volume ($Nm^3$) at the inlet and the exit of the hot stove and at the portions around the tuyere exits in the blast furnace, of the conventional air for blast and a blast (hereinafter referred to as the "1% BF gas-containing blast") prepared by feeding a gas for blast comprising 99 vol.% air for blast, and 1 vol.% blast furnace gas to a hot stove and converting CO contained in said blast furnace gas into $CO_2$ and $H_2$, into $H_2O$ in the hot stove.

In Table 2, the column "A" covers the chemical composition and the volume per $Nm^3$ by constituents of the conventional blast at the inlet of a hot stove; and the column "A'", the chemical composition and the volume per $Nm^3$ by constituents of the 1% BF gas-containing blast at the inlet of a hot stove. The volume ($Nm^3$) of the conventional blast, at the hot stove exit (the column "B") and at the tuyere exits of the blast furnace (the column "C"), is expressed in the ratio to the volume of the blast at the inlet of the hot stove given in said column "A". The volume ($Nm^3$) of the 1% BF gas-containing blast, at the hot stove exit (the column "B'") and at the tuyere exits of the blast furnace (the column "C'"), is expressed in the ratio to the volume of the blast at the inlet of the hot stove given in said column "A".

TABLE 2

|  | Conventional blast | | | 1% BF gas-containing blast | | |
| --- | --- | --- | --- | --- | --- | --- |
|  | "A" at hot stove inlet | "B" at hot stove exit | "C" at tuyere exits | "A'" at hot stove inlet | "B'" at hot stove exit | "C'" at tuyere exits |
| $N_2$ | $Nm^3$ 0.7841 | 0.7841 | 0.7841 | $Nm^3$ 0.7815 | 0.7815 | 0.7815 |
| $O_2$ | $Nm^3$ 0.2084 | 0.2084 | — | $Nm^3$ 0.2063 | 0.2052 | — |
| CO | — | — | 0.4243 | $Nm^3$ 0.0021 | — | 0.4269 |
| $CO_2$ | — | — | — | $Nm^3$ 0.0022 | 0.0043 | — |
| $H_2$ | — | — | 0.0075 | $Nm^3$ 0.0002 | — | 0.0079 |
| $H_2O$ | $Nm^3$ 0.0075 | 0.0075 | — | $Nm^3$ 0.0077 | 0.0079 | — |
| Total Volumic ratio to volume of blast at hot stove inlet | 1.0000 1.0000 | 1.0000 | 1.2159 "a" | 1.0000 1.0000 | 0.9989 | 1.2163 "a'" |

As is clear from Table 2 above, in the case of the conventional blast, the volume "a" ($Nm^3$) at the tuyere exits is 1.2159 times the volume at the hot stove inlet, whereas, in the case of the 1% BF gas-containing blast, the volume "a'" ($Nm^3$) at the tuyere exits is 1.2163 times the volume at the hot stove inlet. Therefore, when using the 1% BF gas-containing blast, the volume ($Nm^3$) of the blast at the tuyere exits would be, as expressed in the ratio "a'/a", 1.0003 times as large as that in the case of the conventional blast, as is evident from the increasing rate of volume ($Nm^3$).

Table 3 shows calorific values at the tuyere exits in the operation using the conventional blast and in the operation using the 1% BF gas-containing blast as expressed in the total heat balance produced in all the relevant reactions.

TABLE 3

|  | Calorific value in operation with conventional blast (Kcal/ton) | Calorific value in operation with 1% BF gas-containing blast (Kcal/ton) |
| --- | --- | --- |
| $C + \frac{1}{2} O_2 = CO$ (exothermic reaction) | +491.23 | +483.69 |
| $H_2O + C = H_2 + CO$ (water gas reaction) | −9.51 | −10.02 |
| $CO_2 + C = 2CO$ (carbon dioxide reduction reaction) | — | −7.91 |
| Heat held by blast | +415.20 | +415.20 |
| Calorific value in hot stove | — | +6.40 |
| Total calorific value | +896.92 | +887.36 |

As is evident from Table 3 given above, the calorific value at the tuyere exits in the blast furnace is 887.36 Kcal/ton in the case of the operation with the 1% BF gas-containing blast, which is smaller than 896.92 Kcal/ton in the case of the operation with the conventional blast. This is attributable to the fact that $CO_2$ and $H_2O$ contained in the blast react with red-hot coke at the tuyere exits, and the endothermic effect produced from the conversion of $CO_2$ into CO and $H_2O$ into $H_2$ causes a decrease in the calorific value.

Accordingly, in order to supply, by using the 1% BF gas-containing blast, a calorific value equal to that obtained with the use of the conventional blast when operating a blast furnace, it would be necessary, to judge from Table 3, to blow blast in a volume, as expressed in the ratio "b/b'", 1.0108 times that of the conventional blast. When the 1% gas-containing blast is blown in a volume 1.0108 times the volume of the conventional blast, the volume of gases produced at the tuyere exits would be 1.0111 times as large as that produced in the case with the conventional blast as shown in the following equation:

$$1.0108 \times (a'/a) = 1.0111 \tag{1}$$

Therefore, when the operation is conducted by blowing the 1% BF gas-containing blast in the same volume as the conventional blast into the blast furnace, the iron production can be reduced by about 1.1% as compared with the case with the conventional blast, as is calculated by the following equation (2):

$$\left( \frac{1 - 1.0111}{1.0111} \right) \times 100 = -1.098 \approx -1.1 \tag{2}$$

Now, the case is described in which the adding ratio of blast furnace gas added to the air for blast before heating in the hot stove was altered and the operation was conducted with the blast thus obtained. Table 4 gives the calorific values at the tuyere exits and the production decrease ratios as compared with the conventional operation, in cases respectively with 1 vol.% (air for blast: 99 vol.%, blast furnace gas: 1 vol.%), 3 vol.% (air for blast: 97 vol.%, blast furnace gas: 3 vol.%), 5 vol.% (air for blast: 95 vol.%, blast furnace gas: 5 vol.%), and 8 vol.% (air for blast: 92 vol.%, blast furnace gas: 8 vol.%) blast furnace gas added to the air for blast before heating in the hot stove.

TABLE 4

|  | Adding ratio of blast furnace gas to air for blast | | | |
| --- | --- | --- | --- | --- |
|  | 1 vol. % | 3 vol. % | 5 vol. % | 8 vol. % |
| Calorific value at tuyere exits (Kcal/ton) | 887.36 | 867.99 | 848.96 | 819.84 |
| Production decrease ratio as compared with conventional operation | 1.1 | 3.2 | 5.3 | 8.6 |

In Table 4, the production decrease ratio as compared with the conventional operation was calculated by comparing with the calorific value at the tuyere exits in the operation with the conventional blast shown in Table 3.

As is clear from Table 4, it is possible to increase the production decrease ratio according as the adding ratio of blast furnace gas to the air for blast is increased.

As is evident from the description given above, when operating a blast furnace, it is possible to reduce the iron production without impairing the furnace conditions by feeding an air for blast added with blast furnace gas to a hot stove and oxidizing, in the hot stove, CO contained in the blast furnace gas into $CO_2$ and $H_2$ contained therein into $H_2O$ to prepare a blast thus containing $CO_2$ and $H_2O$ and additionally heated by the above-mentioned oxidation in said hot stove, and then blowing this blast into a blast furnace in a prescribed volume per unit time. The above-mentioned additional heating of the blast allows reduction of the consumption of coke in the blast furnace, or decrease of the heating temperature of the blast in the hot stove. The blast furnace gas to be added to the air for blast, being recovered from the blast furnace top and used in recycle, leads to only a very slight increase in the iron production costs. Furthermore, in this method of operation, the blast furnace gas recovered from the furnace top, having a smaller nitrogen content than in the blast furnace gas in the conventional operation with a blast added with nitrogen, gives a high calorific value and is therefore superior in the utilization efficiency as a fuel.

Now, the following example covers the case in which, by the method for operating a blast furnace of the present invention, operation is conducted, not with an auxiliary fuel such as heavy oil as fuel and reducing agent, but with coke only.

When operation is conducted, not using an auxiliary fuel such as heavy oil, but using coke only, as in the lower-rate operation mentioned above, the method of the present invention comprises adding a prescribed volume of blast furnace gas to an air for blast to be fed to a hot stove, and oxidizing CO contained in the blast furnace gas into $CO_2$ and $H_2$ contained therein into $H_2O$, and then blowing the blast thus containing $CO_2$ and $H_2O$ and additionally heated by the above-mentioned oxidation into a blast furnace through the tuyeres thereof. Said blast blown into the blast furnace reacts with red-hot coke at the portions around the tuyere exits, and thus, $CO_2$ in the blast is converted into CO, and $H_2O$, into $H_2$. The endothermic effect produced from these reactions causes a decrease in the temperature at the portions around the tuyere exits. The temperature of the blast blown into the blast furnace through the tuyeres thereof can therefore be increased to a higher level by the extent of the temperature decrease at the portions around the tuyere exits. As a result, the increase in the coke consumption per ton of pig iron, which is necessary in the operation with coke only, can be minimized. The above-mentioned additional heating of the blast allows reduction of the consumption of coke in the blast furnace, or decrease of the heating temperature of the blast in the hot stove.

Table 5 gives operating results in the operation with injection of heavy oil as the auxiliary fuel, the operation based on coke only with the conventional blast and the operation based on coke only with the 1% BF gas-containing blast.

TABLE 5

|  | Operation with oil injection (oil rate; 50 kg/ton) | Operation based on coke only | |
| --- | --- | --- | --- |
|  |  | with conventional blast | With 1% BF gas-containing blast |
| Coke rate (kg/ton) | 400 | 480 | 476 |
| Oil rate (kg/ton) | 50 | 0 | 0 |
| Blast temp. (°C.) | 1,300 | 1,050 | 1,090 |
| Blast humidity (g/Nm³) | 10 | 20 | 20 |
| Combustion temp. at tuyere exits (°C.) | 2,420 | 2,300 | 2,300 |

As is evident from Table 5, when the operation based on coke only is carried out with the conventional blast, it is necessary to decrease the blast temperature by 250° C. or by 19.3% for the reasons as mentioned above as compared with the operation with oil injection. To compensate the resulting decrease in the calorific value, the coke rate should be increased by 80 kg/ton or by 20%. When using the 1% BF gas-containing blast, in contrast, it is possible to increase the blast temperature by 40° C. or by about 4% as compared with the operation using the conventional blast, and hence to decrease the coke rate by about 0.84% as compared with the operation using the conventional blast.

When, in the above-mentioned operation based on coke only with the use of the 1% BF gas-containing blast, the blast volume is made equal to the volume of the conventional blast, the iron production decreases as described in the above-mentioned lower-rate operation. Therefore, in order to give the same iron production as in the operation with the conventional blast, the blast volume should be increased over that of the conventional blast.

Even when the operation with injection of an auxiliary fuel such as heavy oil is conducted with a decreased consumption of the auxiliary fuel, for example, heavy oil consumption per ton of pig iron (oil rate), the method of the present invention permits inhibition of the increase in the coke rate. More specifically, when the operation with oil injection is conducted with a decreased oil rate, it is necessary to increase the consumption of coke per ton of pig iron by an amount corresponding to the decrease in the oil consumption for the same reasons as in the above-mentioned operation based on coke only. However, when the BF gas-containing blast is blown into the blast furnace through the tuyeres in accordance with the present invention, the increase in the coke rate can be prevented as in the above-mentioned operation based on coke only.

Table 6 shows operating results of operation with heavy oil injection, in the case with the conventional blast at an oil rate of 50 kg/ton, in the case with the 1% BF gas-containing blast at an oil rate of 40 kg/ton, and in the case with the 1% BF gas-containing blast at an oil rate of 30 kg/ton.

TABLE 6

|  | Operation at oil rate of 50 kg/ton (conventional blast | Operation at oil rate of 40 kg/ton (1% BF gas-containing blast) | Operation at oil rate of 30 kg/ton (1% BF gas-containing blast) |
|---|---|---|---|
| Coke rate (kg/ton) | 400 | 412 | 423 |
| Blast temp. (°C.) | 1,300 | 1,300 | 1,300 |
| Blast humidity (g/Nm$^3$) | 10 | 10 | 10 |
| Combustion temp. at tuyere exits (°C.) | 2,420 | 2,457 | 2,494 |

As is clear from Table 6, even in the operation with a 20% decreased oil rate of 40 kg/ton, when using the 1% BF gas-containing blast, the increase in the coke rate is only 3% over that in the ordinary operation with an oil rate of 50 kg/ton. Similarly, even in the operation with a 40% decreased oil rate of 30 kg/ton, when using the 1% BF gas-containing blast, the increase in the coke rate is only 5.7% over that in the ordinary operation with an oil rate of 50 kg/ton. In order to achieve the same iron production in this operation as in the operation with the conventional blast, it is necessary to increase the blast volume over that of the conventional blast, as mentioned above.

Now, the following description covers an example of the operation based on coke only as mentioned above, conducted with blasts obtained with various adding ratios of blast furnace gas added to the air for blast before heating in the hot stove. Table 7 gives operating results obtained with the adding ratios of blast furnace gas to the air for blast of 1 vol.%, 3 vol.%, 5 vol.% and 8 vol.% as previously described in the example of the lower-rate operation.

TABLE 7

|  | Adding ratio of blast furnace gas to air for blast | | | |
|---|---|---|---|---|
|  | 1 vol. % | 3 vol. % | 5 vol. % | 8 vol. % |
| Coke rate (kg/ton) | 476 | 474 | 471 | 464 |
| Oil rate (kg/ton) | 0 | 0 | 0 | 0 |
| Blast temp. (°C.) | 1,090 | 1,130 | 1,170 | 1,270 |
| Blast humidity (g/Nm$^3$) | 20 | 15 | 10 | 8 |
| Combustion temp. at tuyere exits (°C.) | 2,300 | 2,300 | 2,300 | 2,300 |

As is evident from Table 7, it is possible to increase the degree of decrease in the coke rate according as the adding ratio of blast furnace gas to the air for blast is increased.

As described above, when a blast containing $CO_2$ and $H_2O$, which is obtained by adding a prescribed volume of blast furnace gas to an air for blast to be fed to a hot stove, is blown into a blast furnace through the tuyeres it is possible to conduct an economical operation without impairing the blast furnace conditions in a lower-rate operation, or in an operation based on coke only as fuel and reducing agent, or in an operation with a decreased consumption of an auxiliary fuel such as heavy oil. In this case, the volume of blast furnace gas added to the air for blast should preferably be up to 10 vol.% relative to the total volume of the air for blast and the blast furnace gas. When the volume of blast furnace gas added to the air for blast is over 10 vol.% relative to the total volume of the air for blast and the blast furnace gas, the combustion temperature in the hot stove becomes considerably higher, thus causing such problems as the breakage of bricks of the hot stove and the occurrence of an explosive combustion. The blast furnace gas may be added to the air for blast at any position before the supply of the air for blast to the hot stove, and may be added at an appropriate position in the pipe before or after the blower. However, the blast furnace gas should be well mixed with the air for blast prior to feeding thereof into the hot stove to avoid accident.

According to the method of the present invention, as described above in detail, an efficient operation of a blast furnace can be conducted without impairing the furnace conditions, while preventing the coke rate and the iron production costs from increasing and while minimizing the decrease in the calorific value of blast furnace gas recovered from the furnace top. Particularly when a lower-rate operation is conducted for the adjustment of iron production, or when carrying out an operation based on coke only without using an auxiliary fuel such as heavy oil as fuel and reducing agent or an operation with a decreased consumption of an auxiliary fuel such as heavy oil to cope with the increasing oil price, industrially very useful effects are provided.

What is claimed is:

1. In a method for operating a blast furnace having a plurality of tuyeres around the periphery of the lower portion thereof and coupled to at least one hot stove for heating air to be blown into said blast furnace, which comprises:

adding a blast furnace gas containing CO and $H_2$ to air to form a gas mixture; feeding said gas mixture into said hot stove to heat said gas mixture in said hot stove to thereby oxidize CO into $CO_2$ and $H_2$ into $H_2O$, to form a blast enriched with $CO_2$ and $H_2O$ and further heated through said oxidation reaction; and blowing said blast through said plurality of tuyeres into the lower portion of said blast furnace to bring said blast into contact with red-hot coke in the lower portion of the interior of said blast furnace to cause an endothermic reaction with said red-hot coke to thereby control the calorific value at the portion of the interior of said blast furnace around said tuyeres;

the improvement comprising:

the amount of said blast obtained from said hot stove blown into said blast furnace being an amount substantially equal to that of a blast which would be blown into said blast furnace without addition of a blast furnace gas, thereby decreasing the pig iron production from said blast furnace as compared to the pig iron production which would have been obtained if a substantially equal amount of a blast without addition of a blast furnace gas had been used, without deteriorating the furnace conditions.

2. The method of claim 1, wherein:

said blast furnace gas which is added to air before said air is fed into said hot stove is in an amount up to 10 volume % relative to the total volume of said air and said blast furnace gas.

* * * * *